United States Patent
Lee et al.

(10) Patent No.: US 10,041,499 B2
(45) Date of Patent: Aug. 7, 2018

(54) FAN AND FILTER INSTALLED IN THE SAME

(71) Applicant: DELTA ELECTRONICS, INC., Taoyuan (TW)

(72) Inventors: Kuo-Ying Lee, Taoyuan (TW);
Yueh-Lung Huang, Taoyuan (TW);
Yen-Hung Chen, Taoyuan (TW);
Shih-Yuan Chiang, Taoyuan (TW);
Feng-Ying Lin, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 287 days.

(21) Appl. No.: 14/942,065

(22) Filed: Nov. 16, 2015

(65) Prior Publication Data
US 2016/0356281 A1 Dec. 8, 2016

(30) Foreign Application Priority Data
Jun. 5, 2015 (CN) .......................... 2015 1 0305296

(51) Int. Cl.
*F04D 27/00* (2006.01)
*H02P 6/08* (2016.01)

(52) U.S. Cl.
CPC .............. *F04D 27/004* (2013.01); *H02P 6/08* (2013.01)

(58) Field of Classification Search
CPC .................................. F04D 27/004; H02P 6/08
See application file for complete search history.

(56) References Cited

U.S. PATENT DOCUMENTS

| | | | | |
|---|---|---|---|---|
| 5,952,798 A * | 9/1999 | Jones | ........................ | H02P 6/08 318/254.1 |
| 6,008,603 A * | 12/1999 | Jones | ...................... | H02P 25/03 318/400.32 |
| 6,023,139 A * | 2/2000 | Chin | ...................... | H02H 7/093 318/254.2 |
| 6,772,752 B1 * | 8/2004 | Boyer | ..................... | F24C 7/082 126/21 A |

* cited by examiner

*Primary Examiner* — Patrick Hamo
(74) *Attorney, Agent, or Firm* — Muncy, Geissler, Olds & Lowe, P.C.

(57) ABSTRACT

A fan is provided. The fan includes a first power terminal, a second power terminal, a filter, a motor driver, a motor, a current sensor, and a controller. The filter includes an amplifying element, a resistor, and a capacitor, wherein a first terminal of the amplifying element is electrically connected to the first power terminal, a second terminal of the amplifying element is electrically connected to a first terminal of the resistor, and the capacitor is electrically connected between the second power terminal and a third terminal of the amplifying element. The motor is electrically connected to the third terminal of the amplifying element. The current sensor detects the current flowing through the motor and correspondingly generates a current sensing signal. The controller outputs a first control signal to the resistor according to the current sensing signal such that the amplifying element operating in an active region.

10 Claims, 5 Drawing Sheets

FAN AND FILTER INSTALLED IN THE SAME

CROSS REFERENCE TO RELATED APPLICATION

The present application is based on, and claims priority from, China Application Number 201510305296.2, filed on Jun. 5, 2015, the invention of which is hereby incorporated by reference herein in its entirety.

TECHNICAL FIELD

The disclosure relates to a fan, and more particularly to a fan with a filter installed.

BACKGROUND

In the circuit design of a fan, electromagnetic interference (EMI) noise may often interfere with the normal operation of the electrical circuitry of the fan through the fan's power circuit. Hence, the European Telecommunications Standards Institute (ETSI) has formulated many EMI standards for electronic products, wherein the ETSI EN 300 132-2 standard has determined that the low-frequency EMI noise generated by fan circuitry should be below a proscribed level. Therefore, the present disclosure provides a fan with a filter installed in it for filtering out the low-frequency EMI noise generated by the circuit of the fan.

SUMMARY

An embodiment of the present disclosure provides a fan. The fan comprises a first power terminal, a second power terminal, a filter, a motor driver, a motor, a current sensor, and a controller. The filter comprises an amplifying element, a resistor, and a capacitor, wherein the amplifying element has a first terminal, a second terminal, and a third terminal. The first terminal of the amplifying element is electrically connected to the first power terminal, the second terminal of the amplifying element is electrically connected to a first terminal of the resistor, and the capacitor is electrically connected between the second power terminal and the third terminal of the amplifying element. The motor driver is electrically connected to the third terminal of the amplifying element. The motor is coupled to the motor driver. The current sensor detects the current flowing through the motor and correspondingly generates a current sensing signal. The controller is coupled to a second terminal of the resistor, the motor, and the current sensor, wherein the controller receives the current sensing signal and outputs a first control signal to the resistor according to the current sensing signal such that the controller controls the amplifying element operating in an active region and outputs a second control signal to the motor driver for driving the motor.

An embodiment of the present disclosure provides a filter electrically connected to a first power terminal, a second power terminal, and a fan. The filter comprises an amplifying element, a resistor, and a capacitor. The amplifying element comprises a first terminal, a second terminal, and a third terminal, wherein the first terminal of the amplifying element is electrically connected to the first power terminal, and the third terminal of the amplifying element is electrically connected to a power circuit of the fan. The resistor is electrically connected between the second terminal of the amplifying element and a control voltage node of the fan. The capacitor is electrically connected between the power circuit of the fan and the second power terminal.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

Figure 1:
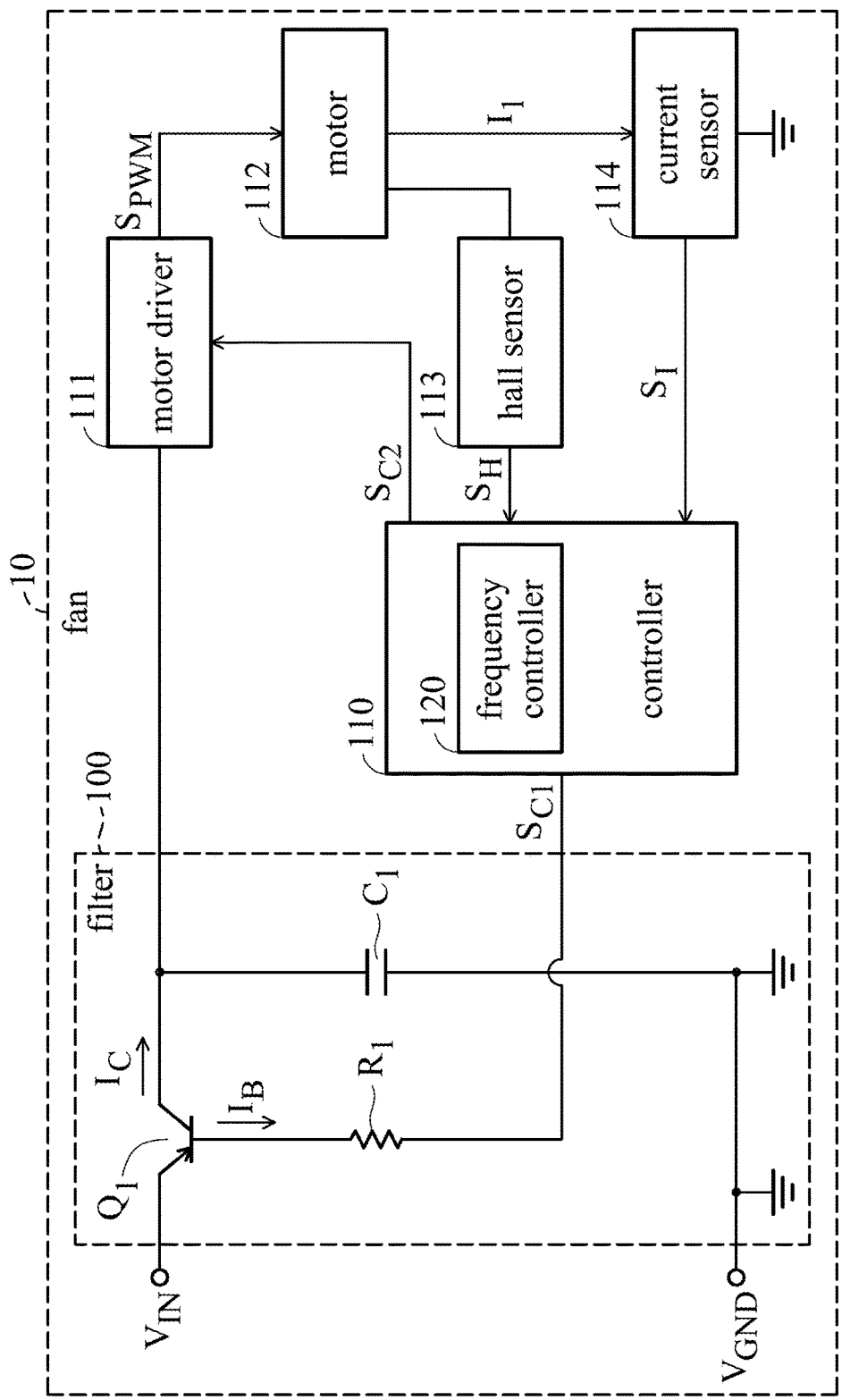
FIG. 1 shows a circuit diagram of a fan according to a first embodiment of the present disclosure.

FIG. 1 shows a circuit diagram of a fan according to a first embodiment of the present disclosure. In the first embodiment of the present disclosure, a fan 10 having a first power terminal $V_{IN}$ and a second power terminal $V_{GND}$, wherein the fan 10 comprises a filter 100, a motor driver 111, a motor 112, a hall sensor 113, a current sensor 114, and a controller 110. As shown in FIG. 1, the filter 100 is coupled between the first power terminal $V_{IN}$ and the second power terminal $V_{GND}$ and used to suppress the EMI noise generated by the motor 112 of the fan 10. The filter 100 comprises an amplifying element Q1, a resistor R1, and a capacitor C1. In the first embodiment of the present disclosure, the filter 100 is a low-frequency active filter, the controller 110 is a known microcontroller unit (MCU), and the controller 110 further comprises a frequency controller 120.

In the first embodiment of the present disclosure, the amplifying element Q1 is a PNP bipolar junction transistor and termed as transistor Q1 below, but the present disclosure is not limited thereto. The transistor Q1 also can be any circuit component which has a voltage/current amplifying function. The transistor Q1 has a first terminal, a second terminal, and a third terminal. The first terminal (emitter) of the transistor Q1 is electrically connected to the first power terminal $V_{IN}$ of the fan 10, the second terminal (base) of the transistor Q1 is electrically connected to a first terminal of the resistor R1, and the third terminal (collector) of the transistor Q1 is electrically connected to a first terminal of the capacitor C1. The second terminal of the capacitor C1 is electrically connected to the second power terminal $V_{GND}$ of the fan 10. As shown in FIG. 1, current $I_C$ is the current flowing through the collector of the transistor Q1, and the current $I_B$ is the current flowing through the base of the transistor Q1. The ratio of the current $I_C$ and the current $I_B$ determines whether the transistor Q1 operates in the active region or not. In the first embodiment of the present disclosure, the transistor Q1 could be operated in the active region such that make sure the filter 100 runs normally. If the transistor Q1 is saturated (i.e., the transistor Q1 operates in saturation region), the filter 100 cannot suppress the EMI noise generated by the motor 112 of the fan 10.

In the first embodiment of the present disclosure, in order to ensure that the transistor Q1 is operating in the active region, the controller 110 outputs a first control signal $S_{C1}$ to control the magnitude of the current $I_B$. The first control signal $S_{C1}$ can be a voltage signal for changing the voltage across the resistor R1 to change the base voltage of the transistor Q1, thereby changing the current $I_B$.

In the first embodiment of the present disclosure, the controller 110 respectively connects to the motor driver 111, a second terminal of the resistor R1, the hall sensor 113, and the current sensor 114. The motor driver 111 is electrically connected the collector of the transistor Q1. The motor 112 is coupled to the motor driver 111. The hall sensor 113 is coupled between the motor 112 and the controller 110. The hall sensor 113 is used to detect rotor positions of the motor 112 and transmit a hall signal $S_H$ to the controller 110, wherein the hall signal $S_H$ comprises the rotor position information of the motor 112. The controller 110 generates a second control signal $S_{C2}$ according to the hall signal $S_H$, and outputs the second control signal $S_{C2}$ to the motor driver 111. The motor driver 111, according to the second control signal $S_{C2}$, generates a pulse-width modulation (PWM) signal $S_{PWM}$ for driving the motor 112.

In the first embodiment of the present disclosure, the current sensor 114 is used to detect an output current $I_1$ of the motor 112 for generating a current sensing signal $S_1$ to the controller 110. The controller 110 finds out the magnitude of the current $I_C$ by the current sensing signal $S_1$, and thereby outputs the first control signal $S_{C1}$ to the resistor R1 such that the transistor Q1 can operate in the active region. In addition, it is noticeable that the loading sensors of the motor 112 of the present disclosure are not limited to the hall sensor 113 and the current sensor 114 disclosed in the first embodiment. Any sensor for detecting the current status of the motor 112 is not outside the scope of the present disclosure.

The filter 100 shown in the first embodiment of the present disclosure can operate at a wide range of working voltages. Hence, the fan 10 can be connected directly to a power source without a voltage-conversion circuit. The amplification feature of the transistor Q1 of the filter 100 allows the circuit designer to select a lower-resistance resistor R1 and a capacitor C1 with lower capacitance. Therefore, the required circuit area of the fan 10 can be reduced.

Figure 2:
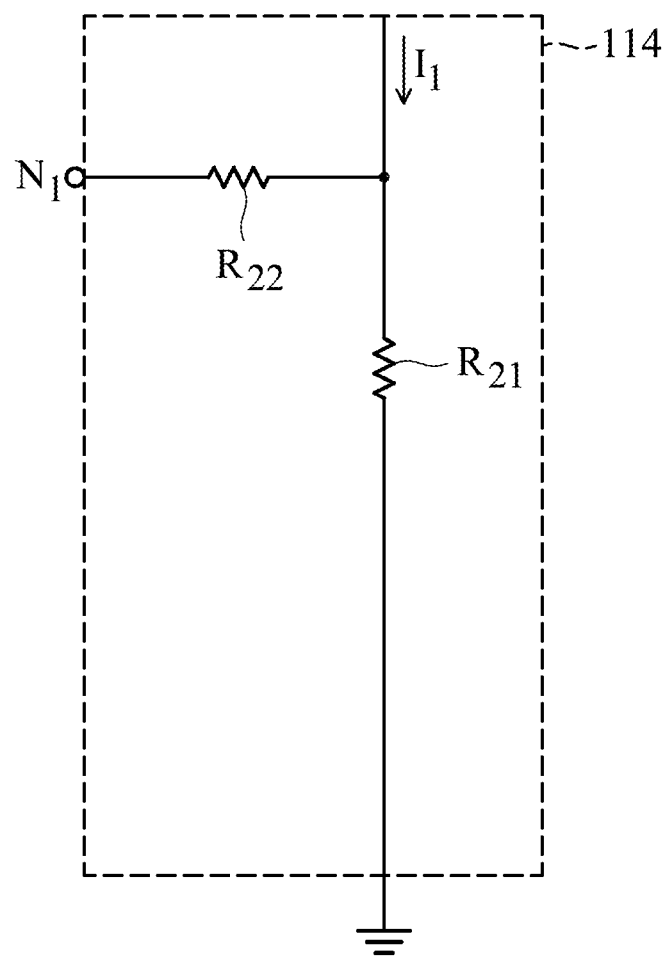
FIG. 2 shows a circuit diagram of a current sensor according to a second embodiment of the present disclosure.

FIG. 2 shows a circuit diagram of a current sensor according to a second embodiment of the present disclosure. In the second embodiment of the present disclosure, the current sensor 114 is a voltage divider circuit, but the present disclosure is not limited thereto. The current sensor 114 can be any other circuit having the function of detecting current. As shown in FIG. 2, the current sensor 114 is a voltage divider circuit composed of a resistor R21 and a resistor R22, wherein the resistor R21 is electrically connected between the motor 112 and the second power terminal $V_{GND}$, and the resistor R22 is electrically connected between the motor 112 and a node $N_1$. In the second embodiment of the present disclosure, the controller 110 calculates the output current $I_1$ of the motor 112 by detecting the voltage/current in the node $N_1$.

Figure 3:
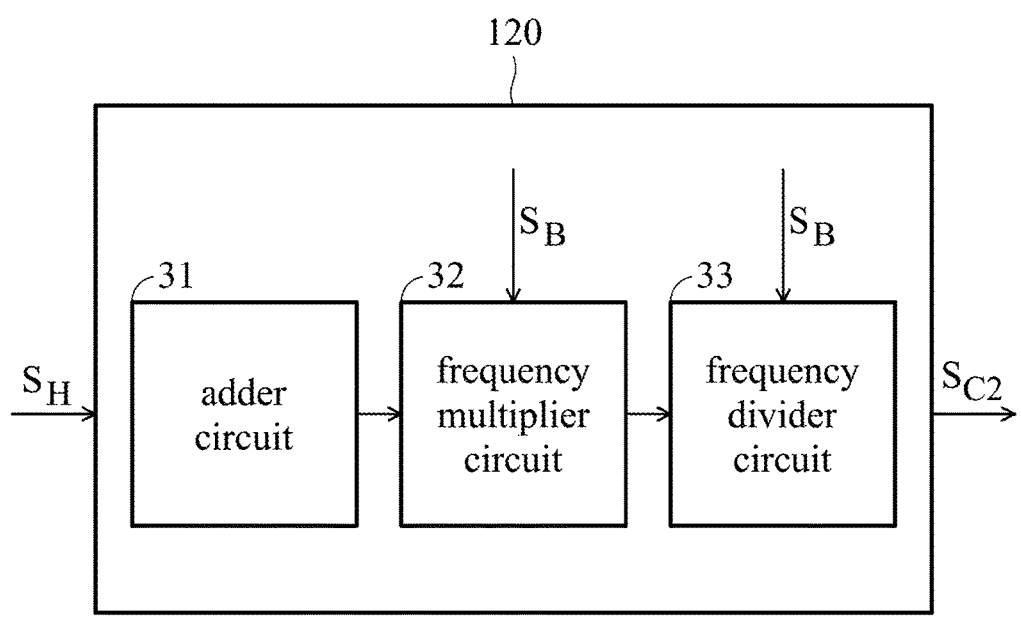
FIG. 3 shows a block diagram of a frequency controller according to a third embodiment of the present disclosure.

FIG. 3 shows a block diagram of a frequency controller according to a third embodiment of the present disclosure. In the third embodiment of the present disclosure, a frequency controller 120 comprises an adder circuit 31, a frequency multiplier circuit 32, and a frequency divider circuit 33. The frequency controller 120 receives the hall signal $S_H$ of the hall sensor 113 and a baseband control signal $S_B$, wherein the baseband control signal $S_B$ is referred to a reference clock signal. The frequency controller 120 outputs the second control signal $S_{C2}$ according to the hall signal $S_H$ and the baseband control signal $S_B$. The adder circuit 31, according to the hall signal $S_H$, calculates the rotor positions of the motor 112 for the next baseband control signal $S_B$. The frequency multiplier circuit 32 progressively increases the original baseband control signal $S_B$ to a high-frequency output signal. The frequency divider circuit 33 is used to progressively decrease the high-frequency output signal into output baseband signals.

In the third embodiment of the present disclosure, the frequency controller 120 alternates the frequency of the second control signal $S_{C2}$ with the help of the frequency multiplier circuit 32 and the frequency divider circuit 33. Hence the motor driver 111 can, according to the second control signal $S_{C2}$, output the pulse-width modulation signal $S_{PWM}$ with different frequencies for driving the motor 112. For example, as shown in FIG. 3, the frequency multiplier circuit 32 of the frequency controller 120 progressively increases a 25 KHz baseband control signal $S_B$ to a higher 30 KHz output signal such that the frequency of the second control signal $S_{C2}$ increases gradually. Then the frequency divider circuit 33 of the frequency controller 120 decreases the 30 KHz output signals to a lower 25 KHz output baseband signals such that the second control signal $S_{C2}$ decreases gradually to the original frequency. Through the modulation method of the third embodiment of the present disclosure, the motor 112 can be operated by pulse-width modulation signals $S_{PWM}$ of different frequencies.

When the motor 112 is operated continuously by the same pulse-width modulation signals $S_{PWM}$, the frequency distribution of the low-frequency noise generated by the motor 112 will centralize to a specific frequency. It will cause significant low-frequency noise at the specific frequency. However, through the modulation method of the third embodiment of the present disclosure, the frequency controller 120 alternates the frequency of the second control signal $S_{C2}$ such that the motor 112 can be operated by the pulse-width modulation signals $S_{PWM}$ of different frequencies. Hence, the frequency distribution of the low-frequency noise generated by the motor 112 will be much more uniformly distributed in the frequency spectrum, rather than being distributed on the specific frequency. Therefore the original low-frequency noise with the specific frequency can be suppressed. In addition, the frequency controller 120 of the third embodiment of the present disclosure also can modulate the frequency of the second control signal $S_{C2}$ such that the frequencies of the low-frequency noise generated by the motor 112 can be distributed in the bandwidth of the filter 100.

Figure 4:
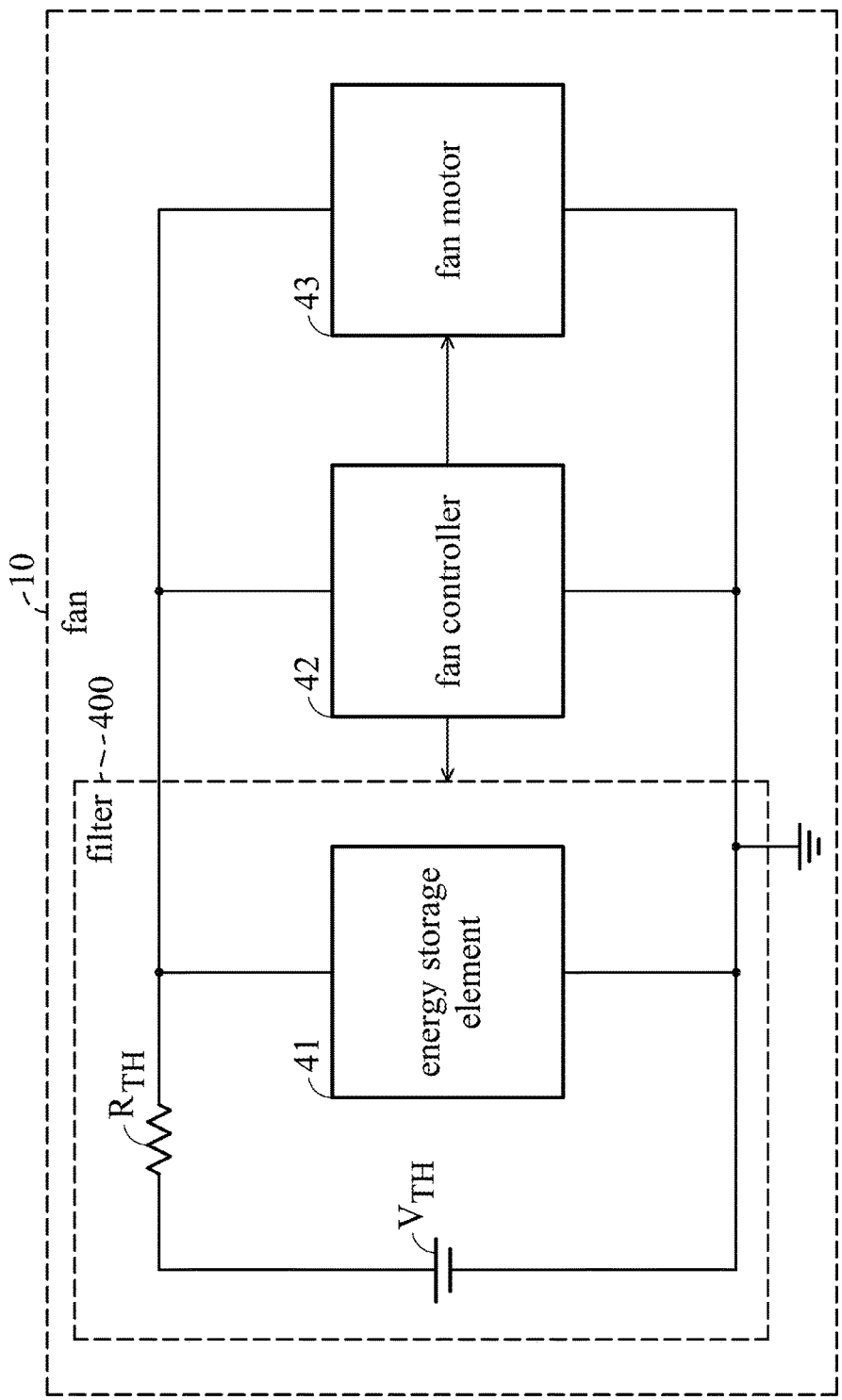
FIG. 4 shows an equivalent circuit of the fan according to a fourth embodiment of the present disclosure.

FIG. 4 shows an equivalent circuit of the fan according to a fourth embodiment of the present disclosure. In the fourth embodiment of the present disclosure, the equivalent circuit of a fan 10 is composed by a filter 400, a fan controller 42, and a fan motor 43. As shown in FIG. 4, the filter 400 is an RC filter composed of an equivalent input voltage $V_{TH}$, an equivalent resistor $R_{TH}$, and an energy storage element 41, wherein the input voltage $V_{TH}$ is an input voltage source of the fan 10, the equivalent resistor $R_{TH}$ is the equivalent input resistor of the fan 10, and the energy storage element 41 is an equivalent input capacitor between the first power terminal $V_{IN}$ and the second power terminal $V_{GND}$ of the fan 10. The filter 400 is used to suppress the EMI noise generated from the motor 43. In the equivalent circuit of the fourth embodiment, the fan controller 42 is corresponding to the controller 110, the frequency controller 120, and the hall sensor 113 of the fan 10, and the fan motor 43 is corresponding to the motor driver 111, the motor 112, and the current sensor 114 of the fan 10. The fan controller 42 is connected to the filter 400 and the fan motor 43, and is used to control the filter 400 and the fan motor 43. The fan controller 42 is used to ensure that when the fan motor 43 is operated by the pulse-width modulation signals $S_{PWM}$ of different frequencies, the filter 400 can always suppress the EMI noise generated by the fan 10. In other words, the fan controller 42 controls the transistor Q1 of the fan 10 to always operate in the active region.

Figure 5:
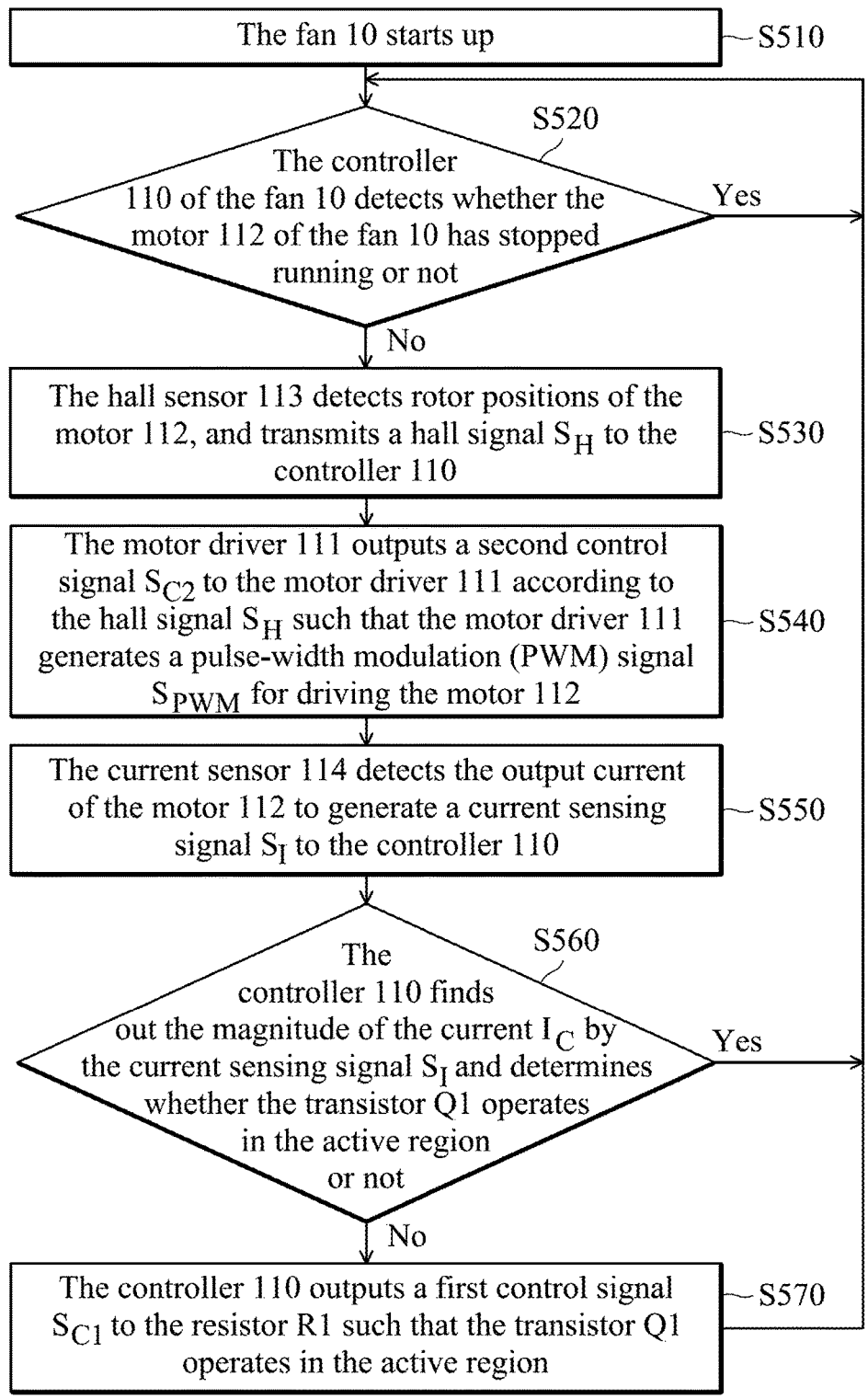
FIG. 5 shows a flow diagram of implementing a control method applying on a transistor filter of the fan according to a fifth embodiment of the present disclosure.

FIG. 5 shows a flow diagram of implementing a control method applied to a transistor filter of a fan according to a fifth embodiment of the present disclosure. In step S510, the fan 10 starts up. In step S520, the controller 110 of the fan 10 detects whether the motor 112 of the fan 10 has stopped running or not. If the controller 110 of the fan 10 detects that the motor 112 of the fan 10 does not stop running, the method proceeds to step S530; otherwise, the method returns to step S520. In step S530, the hall sensor 113 detects rotor positions of the motor 112, and transmits a hall signal $S_H$ to the controller 110. In step S540, the controller 110 outputs a second control signal $S_{C2}$ to the motor driver 111, according to the hall signal $S_H$, such that the motor driver 111 generates a pulse-width modulation (PWM) signal $S_{PWM}$ for driving the motor 112. In step S550, the current sensor 114 detects the output current of the motor 112 to generate a current sensing signal $S_1$ to the controller 110. In step S560, the controller 110 finds out the magnitude of the current $I_C$ by the current sensing signal $S_1$ and determines whether the transistor Q1 operates in the active region or not. If the controller 110 determines that the transistor Q1 operates in the active region, the method returns to step S520. If the controller 110 determines that the transistor Q1 does not operate in the active region, the method proceeds to step S570. In step S570, the controller 110 outputs a first control signal $S_{C1}$ to the resistor R1 such that the transistor Q1 operates in the active region. Finally, the method repeats and returns to step S520. Through the control method applying on the transistor filter of the fan 10 of the fifth embodiment, the filter 100 of the fan 10 can operate continuously in the active region. The fan 10 can ensure that when the motor 112 is operated by the pulse-width modulation signals $S_{PWM}$ of different frequencies, the filter 100 can always suppress the low-frequency EMI noise generated by the fan 10.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

While the present disclosure has been described by way of example and in terms of preferred embodiment, it should be understood that the present disclosure is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A fan, comprising:
a first power terminal;
a second power terminal;
a filter, comprising a transistor, a resistor, and a capacitor, wherein the transistor has a first terminal, a second terminal, and a third terminal, the first terminal of the transistor is electrically connected to the first power terminal, the second terminal of the transistor is electrically connected to a first terminal of the resistor, and the capacitor is electrically connected between the second power terminal and the third terminal of the transistor;
a motor driver, electrically connected to the third terminal of the transistor;
a motor, coupled to the motor driver;
a current sensor, detecting the current flowing through the motor and correspondingly generating a current sensing signal; and
a controller, coupled to a second terminal of the resistor, the motor, and the current sensor, wherein the controller receives the current sensing signal and outputs a first control signal to the resistor according to the current sensing signal such that the controller controls the transistor operating in an active region and outputs a second control signal to the motor driver for driving the motor.

2. The fan of claim 1, further comprising:
a hall sensor, coupled between the motor and the controller, used to detect rotor positions of the motor and transmit the rotor positions to the controller.

3. The fan of claim 2, wherein the controller further comprises a frequency controller, the frequency controller modulates the second control signal according to the rotor positions such that low-frequency noises generated by the fan are located within a bandwidth of the filter.

4. The fan of claim 1, wherein the current sensor is a voltage divider circuit.

5. The fan of claim 1, wherein the controller finds out the magnitude of an output current of the third terminal of the transistor according to the current sensing signal; and
wherein the controller, according to the magnitude of the output current, outputs the first control signal to the resistor for controlling the transistor operating in the active region.

6. The fan of claim 1, wherein the transistor is a bipolar junction transistor and the second power terminal is connected to ground.

7. A filter electrically connected to a first power terminal, a second power terminal, and a fan, the filter comprising:
a transistor, comprising a first terminal, a second terminal, and a third terminal, wherein the first terminal of the transistor is electrically connected to the first power terminal, and the third terminal of the transistor is electrically connected to a power circuit of the fan;

a resistor, electrically connected between the second terminal of the transistor and a control voltage node of the fan; and a capacitor, electrically connected between the power circuit of the fan and the second power terminal.

8. The filter of claim 7, wherein the fan outputs a first control signal to the resistor by the control voltage node for controlling the transistor operating in an active region.

9. The filter of claim 7, wherein the fan further comprises a motor and a motor driver, and the power circuit provides power to the motor driver for driving the motor.

10. The filter of claim 7, wherein the transistor is a bipolar junction transistor, and the second power terminal is connected to ground.

* * * * *